Dec. 2, 1930.  N. GRIBOJEDOFF  1,783,877
VARIABLE SPEED AND REVERSING EPICYCLIC GEAR
Filed Sept. 7, 1929  3 Sheets-Sheet 3

INVENTOR
Nicolai Gribojedoff,
BY
ATTORNEY

Patented Dec. 2, 1930

1,783,877

UNITED STATES PATENT OFFICE

NICOLAI GRIBOJEDOFF, OF TEDDINGTON, ENGLAND

VARIABLE-SPEED AND REVERSING EPICYCLIC GEAR

Application filed September 7, 1929, Serial No. 391,032, and in France October 1, 1928.

This invention relates to variable speed and reversing epicyclic gears and has for its object to provide a new or improved gear employing planetary pinions which will be capable of giving a continuously variable speed ratio in either direction, the speed ratio being automatically governed by the work entailed. The gear is also adapted to be employed as a brake as hereinafter explained.

According to the invention an epicyclic gear is provided in which the power is transmitted through planet wheels which gear with a pinion and crown wheel and which turn in the same direction for forward and rearward driving.

In carrying the invention into effect each of the planet wheels is composed of a series of toothed discs which alternate with plain discs keyed to the pinion shaft, and are capable of being clutched thereto for the purpose of obtaining forward driving. The planet wheel carrier is also controlled by a friction brake which is applied when reversed driving is required.

In order that the invention may be properly understood, reference will now be made to the accompanying drawings in which:—

Figure 1:
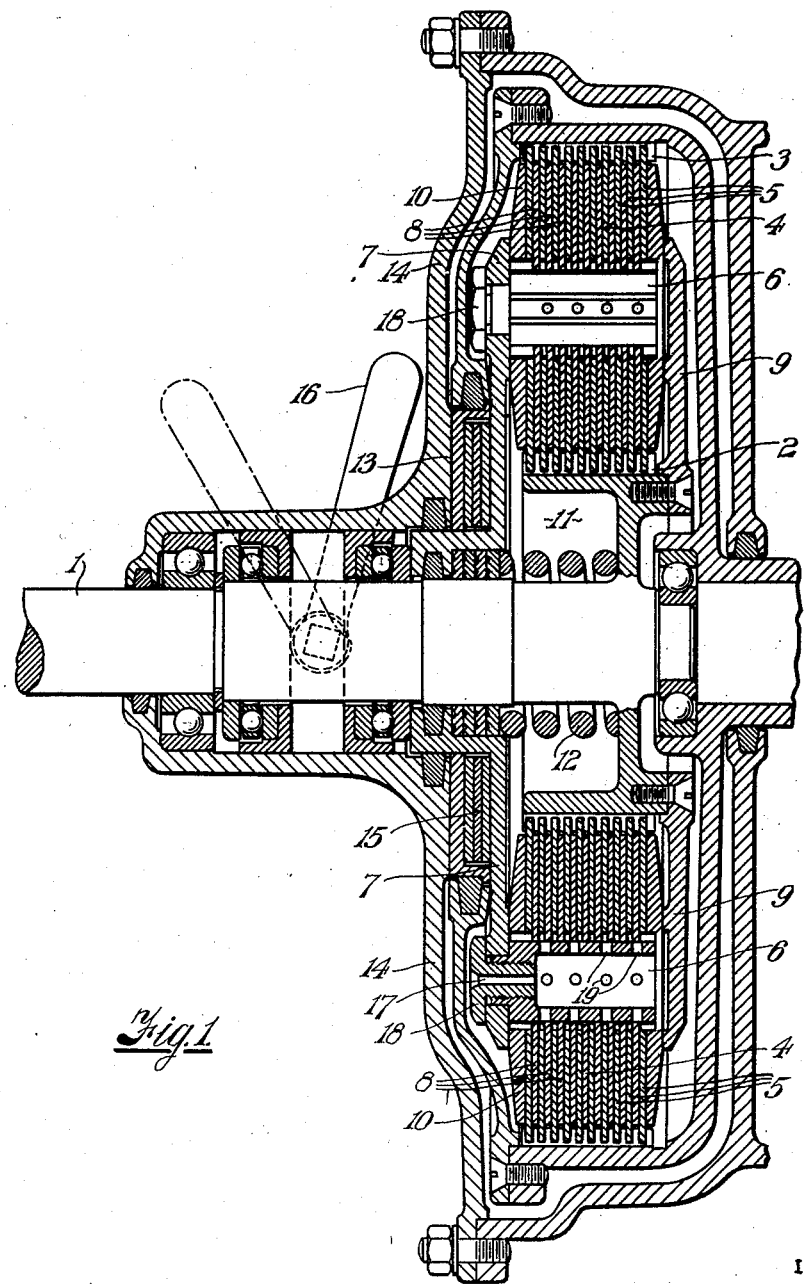
Figure 2:
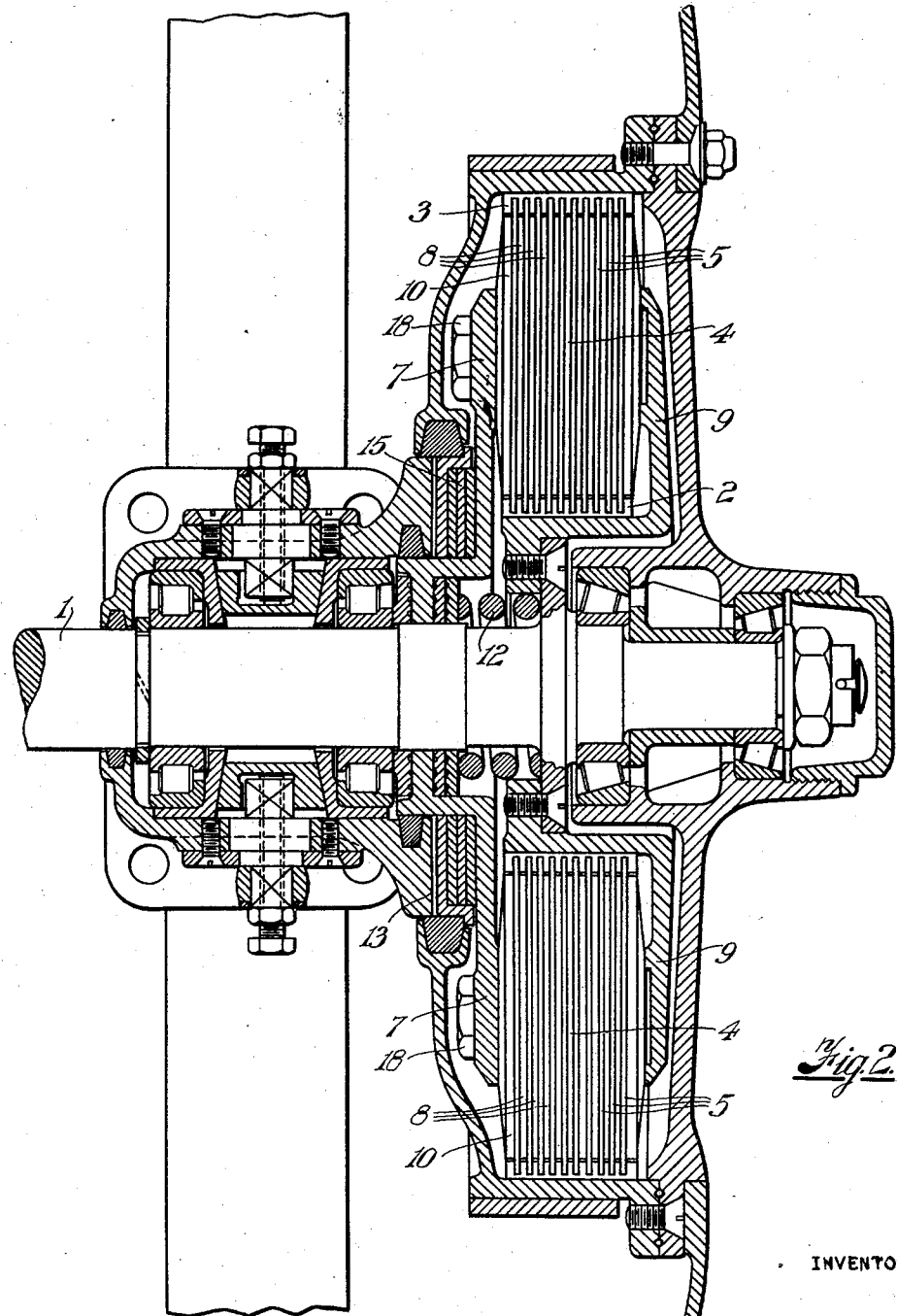
Figure 3:
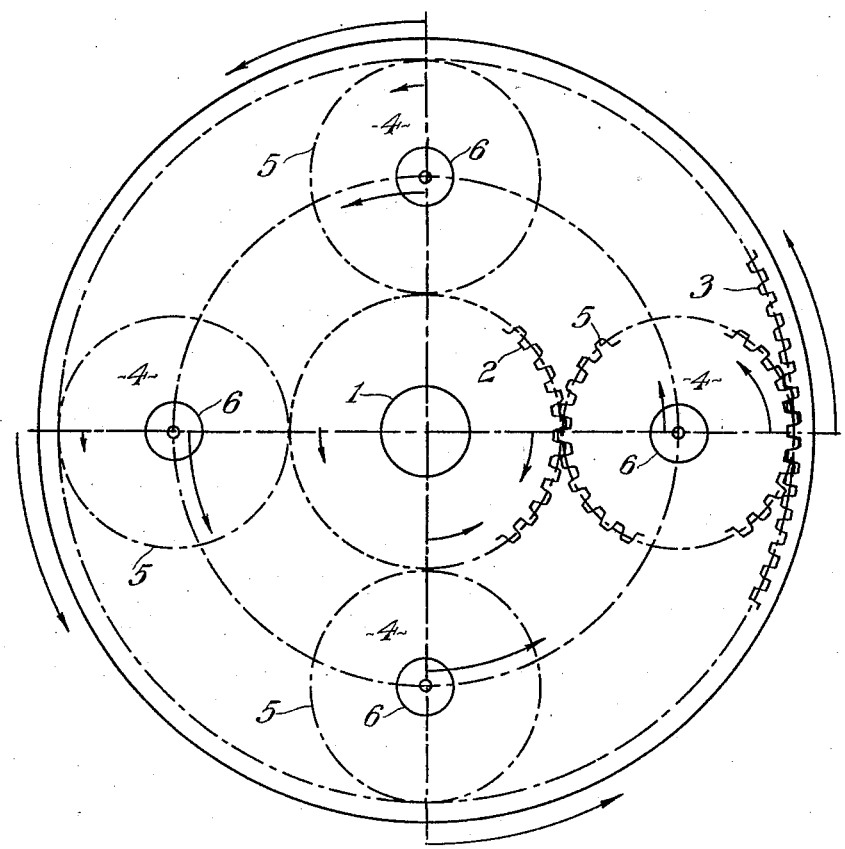

Figure 1 is a vertical section through the engine flywheel in which an epicyclic gear constructed according to the invention is incorporated, Figure 2 is a vertical section through a gear according to the invention mounted in the hub of a vehicle wheel and, Figure 3 is a diagrammatic elevation showing the arrangement of the elements of the epicyclic gear.

As shown in the drawings the driving shaft 1 carrying a central pinion 2 of the epicyclic gear drives an internally toothed crown wheel 3 which is fixed on a driven shaft as shown in Figure 1 or to the hub of a driven wheel as shown in Figure 2.

Each of the planet wheels of the epicyclic gear is composed of a series of toothed discs 5 mounted loosely on a spindle 6 fixed to the planet wheel carrier 7 and interleaved with friction discs 8 which are free to move longitudinally of the spindle 6 but are prevented from rotating thereon by the engagement of projections on the discs with grooves in the spindle.

The discs 5 and 8 are located between cheeks 10 on the spindles 6 and are capable of being clamped against the planet wheel carrier 7 by a plate 9 which is fixed to the pinion 2.

The planet wheel carrier 7 is loosely mounted on the spindle 1 with limited play longitudinally of the latter, and a helical spring 12 is interposed between the planet wheel carrier 7 and the pinion 2.

The spring 12 tends to press the planet wheel carrier 7 into engagement with a fixed friction brake element 13. As shown in Figure 1, the element 13 is fixed to a non-rotatable casing 14 which encloses the gear. As shown in Figure 2, the element 13 is fixed to the spring pad of the vehicle. A number of loose friction discs 15 are interposed between the planet wheel carrier 7 and the friction brake element 13 so as to obtain a smooth and progressive braking action between these elements.

An operating lever 16 is mounted on the casing 14, as shown in Figure 1, for the purpose of shifting the planet wheel carrier 7 longitudinally of the shaft 1 against the action of the spring 12 so as to release the planet wheel carrier from engagement with the brake element 13 and to clamp the disks 5 and 8 between the cheeks 9 and 10. When the lever 16 is in its intermediate position, both the brake element 13 and the discs 5 and 8 are free from pressure, the driving shaft 1 will be disengaged from the driven shaft or element. The gear shown in Figure 2 is provided with a similar arrangement, and the parts are shown in Figure 2 in the positions which they occupy during forward driving at maximum speed when the brake between the elements 7 and 13 is released and the discs 5 and 8 are clamped together so that the driving shaft will be connected directly to the driven shaft or element.

The spindles 6 are hollow, as shown in the lower part of Figure 1, and are provided at one end with oilways 17 from which lubricant passes into the spindles. The oil flows out from the spindles through openings 19 into the spaces between the discs 5 and 8 and lubricates the friction surfaces. The oil is contained in the casing 14 (Figure 1) or in the hub of the wheel shown in Figure 2 and is continually circulated through the oilways 17, openings 19 and between the discs 5 and 8 by the action of centrifugal force.

In the operation of the gear during forward driving the brake between the elements 7 and 13 is released and the discs 5 and 8 are pressed together. By adjusting the position of the lever 16 the pressure between the plates 5 and 8 and the thickness of the oil film between them can be varied so that the speed of the driven shaft can be varied continuously through intermediate speeds in which the discs 5 turn on their spindles to a maximum speed in which the gear drives solid.

When it is required to reverse the direction of the drive the lever 16 is moved to a position in which the brake between the elements 7 and 13 is brought into action, the pressure between the plates 5 and 8 being released. During reverse drive the plates 5 continue to rotate on their spindle 6 in the same direction as indicated by the arrows in Figure 3 of the drawings, but the direction of rotation of the toothed crown 3 is reversed owing to the braking action on the planet wheel carrier 7. The reverse drive may be used as a brake since the planet wheel carrier 7 can rotate against the action of its friction brake to permit the driven shaft to continue to rotate in the forward direction during deceleration after the gear has been reversed. The driven element may be freed from the driving element by bringing the lever 16 into its intermediate position so as to release both the elements 7, 13 and the discs 5, 8 from pressure.

It will be understood that the constructions described with reference to the drawings may be varied in their details without departing from the invention, and that, if desired, the pinion 2 may be the driven element and the crown wheel 3 the driving element instead of vice versa as hereinbefore described. Further, the crown wheel 3 may be formed as a pulley driving or driven by a belt.

I claim:

1. An epicyclic variable speed and reversing gear comprising a driving shaft, a driving pinion mounted on said shaft and having a plate extending from its periphery, a driven internally toothed crown wheel coaxial with and enclosing said pinion, a planet wheel carrier rotatable on and slidable longitudinally of said shaft, a plurality of planet wheels mounted on said carrier between the latter and said plate and meshing with said pinion and crown wheel, each of said planet wheels comprising a plurality of interleaved friction disks and peripherally toothed discs held against rotation when clamped together between said carrier plate and friction braking means mounted for cooperation with said carrier, the movement of the carrier longitudinally of said shaft controlling clamping and releasing of said friction disks and engagement and disengagement of the carrier with said friction brake means.

2. An epicyclic variable speed and reversing gear according to claim 1 including an expansive spring between the pinion and carrier, spindles extending from the carrier and on which said planet wheels are mounted, and a mounting member for the shaft, and wherein the braking means comprises a brake element carried by the mounting member and one side of the carrier.

In witness whereof I affix my signature.

NICOLAI GRIBOJEDOFF.